United States Patent [19]
Englar

[11] Patent Number: 5,908,217
[45] Date of Patent: *Jun. 1, 1999

[54] PNEUMATIC AERODYNAMIC CONTROL AND DRAG-REDUCTION SYSTEM FOR GROUND VEHICLES

[75] Inventor: Robert J. Englar, Marietta, Ga.

[73] Assignee: Georgia Tech Research Corporation, Atlanta, Ga.

[*] Notice: This patent issued on a continued prosecution application filed under 37 CFR 1.53(d), and is subject to the twenty year patent term provisions of 35 U.S.C. 154(a)(2).

[21] Appl. No.: 08/503,185

[22] Filed: Jul. 17, 1995

[51] Int. Cl.$^6$ .................................................. B62D 35/02
[52] U.S. Cl. .................... 296/180.1; 296/208; 296/180.5
[58] Field of Search ............................. 296/180.4, 180.1, 296/208, 180.5, 185

[56] References Cited

U.S. PATENT DOCUMENTS

| | | | |
|---|---|---|---|
| 1,923,349 | 8/1933 | Wolverton | 296/180.1 |
| 2,037,942 | 4/1936 | Stalker | 296/185 X |
| 3,062,483 | 11/1962 | Davidson | 244/207 |
| 3,348,622 | 10/1967 | Papst | 296/180.1 X |
| 3,437,371 | 4/1969 | Gallie et al. | 296/1 |
| 3,529,862 | 9/1970 | Jousserandot | 296/180.1 |
| 3,670,994 | 6/1972 | Kizilos | 244/207 |
| 3,830,450 | 8/1974 | Williams et al. | 244/42 |
| 3,952,823 | 4/1976 | Hinderks | 180/64 |
| 4,387,869 | 6/1983 | Englar et al. | 244/207 |
| 4,457,480 | 7/1984 | Englar et al. | 244/207 |
| 4,736,913 | 4/1988 | Bennett et al. | 244/130 |
| 4,810,022 | 3/1989 | Takagi et al. | 296/180.5 |
| 4,844,385 | 7/1989 | Bennett et al. | 244/207 |
| 4,987,542 | 1/1991 | Tran | 364/424.05 |
| 5,013,080 | 5/1991 | Garrone et al. | 296/180.5 |
| 5,365,490 | 11/1994 | Katz | 244/204 X |
| 5,374,013 | 12/1994 | Bassett et al. | 296/180.1 X |
| 5,379,218 | 1/1995 | Jacobi et al. | 296/180.5 X |
| 5,407,245 | 4/1995 | Geropp | 296/180.1 |

FOREIGN PATENT DOCUMENTS

| | | | |
|---|---|---|---|
| 916198 | 11/1946 | France . | |
| 1168556 | 12/1958 | France . | |
| 649343 | 2/1935 | Germany . | |
| 2935-324 | 3/1981 | Germany | 296/180.1 |
| 32 30 640 | 2/1984 | Germany . | |
| 32 30 641 | 2/1984 | Germany . | |
| 3620843 | 12/1987 | Germany | 296/180.5 |

Primary Examiner—Dennis H. Pedder
Attorney, Agent, or Firm—Thomas, Kayden, Horstemeyer & Risley, L.L.C.

[57] ABSTRACT

A blowing system for controlling the aerodynamics of a ground vehicle comprises a source of compressed air, a valve for regulating the flow of the compressed air, and a plenum for discharging the air at a rear portion of the vehicle. The air discharged through the plenum prevents flow separation and consequently reduces the drag on the vehicle. It may also increase lift, reducing effective weight and thus rolling resistance of the tires, or decrease lift to improve tire traction and handling. The blowing system may have separate plenums for the left and right sides of the vehicle whereby vortex roll-up and flow separation which occur on only one side of the vehicle may be eliminated. Asymmetrical blowing of only one plenum will produce rolling and yawing moments to restore the vehicle's lateral/directional stability when exposed to a side wind. Further, the blowing system may have a lower plenum for reattaching flow, generating a negative lift or download to increase traction, braking, and handling and for generating pitch trim. The blowing system may have a number of sensors for detecting various conditions, such as the direction and pressure of a relative wind, turbulence at the rear of the vehicle, braking, or angle of steering. The blowing system may be responsive to one or more of these conditions to selectively adjust the aerodynamics of the vehicle.

28 Claims, 6 Drawing Sheets

PNEUMATIC AERODYNAMIC CONTROL AND DRAG-REDUCTION SYSTEM FOR GROUND VEHICLES

FIELD OF INVENTION

This invention generally relates to a system for controlling the aerodynamics of a ground vehicle and, more particularly, to a system which efficiently blows small amounts of air to improve the aerodynamics of the ground vehicle.

BACKGROUND OF THE INVENTION

The aerodynamics of ground vehicles are adversely influenced by a number of factors, such as separated air flow-fields and vortex formation and shedding. When a ground vehicle encounters a relative wind, such as when the vehicle is in motion, the air travels along the surface of the vehicle and typically separates from the vehicle at the rear portion of the vehicle. The separated flow-fields cause an increased drag on the vehicle, increased fuel consumption, and an increased level of noise perceived within the interior of the vehicle, plus a loss in cruise efficiency and in economic operation. Resulting lift can positively or adversely effect the vehicle's performance and control.

In general, the vortex formation and shedding is the result of a flow around curved surfaces between differential upper and lower surface pressure distributions. With ground vehicles, a vortex formation is caused by unlike pressure distributions between the upper and lower surfaces of the ground vehicle which induces a drag on the vehicle. The drag increase caused by the vortex thus formed varies in proportion to the square of the lift coefficient experienced by the vehicle and in proportion to the square of the vehicle's velocity.

Because of the above-noted problems, ground vehicles have been designed to be more streamlined so as to reduce the amount of flow separation and vortex formation. While recent ground vehicles are much more streamlined than past models, the recent designs still have a value of practical vehicle drag which is much higher than that of an ideal streamlined body. Thus, today's ground vehicles still experience a significant amount of flow separation and vortex formation.

Some additional aerodynamic problems are related to the sensitivity of a ground vehicle to side winds or to the vehicle being yawed relative to the flow direction, such as when the vehicle is cornering or when it receives gusts from passing vehicles. These situations, such as when the car is cornering or receiving side gusts, can yield both directional instabilities about a vertical yaw axis and lateral instabilities about a horizontal roll axis. As a result of these directional instabilities about the yaw and roll axes, a driver of the vehicle may have difficultly in maintaining control at any time that the relative wind is not from straight ahead of the vehicle. There is therefore a need to provide greater stability to a ground vehicle when it receives relative wind from a direction other than from straight ahead of the vehicle.

The variation in yaw-sensitivity for a standard car and for a streamlined car is plotted in FIG. 1(A). As evident from FIG. 1(A), the standard sharp-cornered car is stable even up to 35° of yaw angle because the flow of air around the front corners of the car separates and prevents increasing side loads and yawing moment. The streamlined car, in contrast, begins to show rapid aerodynamic force changes at yaw angles as low as 20° and therefore experiences lateral or directional instabilities. Since recent designs of cars are more streamlined, the cars tend to become unstable at lower angles of yaw.

A further problem experienced by ground vehicles is ground effect which is caused by the proximity of the lower surface of the car to the roadway over which it is moving. The problem of ground effect can dramatically change the flow-field around the lower surface of the car compared to its "free-stream" flow pattern. As evident from FIG. 1(B), depending upon the particular design of the ground vehicle, both the lift and drag can increase or decrease significantly as the clearance between the ground and the lower surface of the vehicle is reduced. The ground effect, however, is rather unpredictable and is difficult to control.

Lift generated by a streamlined car can also cause control problems; it can effectively reduce vehicle weight and thus reduce tire traction and cornering ability. Some high speed vehicles employ spoilers or inverted airfoils to reduce this lift. Both will cause increased download to increase tire traction and handling. However, the increased lift and reducing rolling resistance can improve cruise efficiency.

The various aerodynamic forces acting upon a ground vehicle, such as flow separation, vortex formation, side winds, and ground effect, can dramatically influence the performance, economy of operation and control of the ground vehicle. Some conventional approaches to the problem have included designing the vehicles with more streamlined shapes, equipping them with larger wheels to remove the lower surface of the car from the road to decrease ground effect, and the use of numerous mechanical devices, such as air dams and spoilers.

While these conventional approaches may reduce to some effect the above-noted problems, each of the approaches is limited in its effectiveness or desirability. For instance, streamlined shapes may be too limiting in the internal dimensions of the vehicle, the passenger and payload room, as well as resulting in a more expensive vehicle to manufacture. While larger wheels may reduce the ground effect in some vehicles, the larger wheels may cause lateral instability due to the high center of gravity thus created and may increase the risk of roll-over for the vehicle. As for mechanical aerodynamic controls, these devices add weight and undue complexity to the vehicle. Further, since the mechanical controls usually cause drag at off-design conditions, e.g., lower or higher speeds, the mechanical controls desirably must be mechanically adjustable, which further adds to the weight and complexity.

Another approach in improving the aerodynamics of a ground vehicle involves redirecting air through portions of the vehicle. U.S. Pat. No. 3,437,371 to Gallie et al. provides an example of such a system in which air is drawn in through slots at the rear portion of the vehicle and is routed through pipes to the front of the vehicle. The front area of the vehicle is at a low pressure and provides the suction force to draw the air in through the slots in the rear of the vehicle thereby to reduce the amount of flow separation. This system has minimal benefit on the aerodynamics of the vehicle inasmuch as the amount of suction force generated at the front of the vehicle will likely at most speeds be insufficient to alter the flow at the rear of the vehicle, especially in view of the amount of friction generated within the air pipes or ducts. This system further suffers from a disadvantage that the suction forces cannot be controlled independently of the vehicle's speed.

Another type of system reduces the flow separation by blowing air out of a region of the vehicle thus eliminating reliance on suction or low pressure areas. For instance, U.S. Pat. No. 5,407,245 to Geropp discloses a system in which air is drawn in through openings in a rear region of the vehicle and is blown out along lines of separation of the vehicle. The system uses a pair of blowers to draw air in through openings formed in the rear surface of the vehicle and to force the air out of bores or slots at or near the separation region. This type of system still depends upon recirculating air through the car but is better able to reduce flow separation and the amount of drag on the vehicle.

The system disclosed in the Geropp patent, while reducing the flow separation, has several apparent disadvantages. The system employs blowers which add a further drain on the vehicle's power system and present another mechanical component requiring maintenance or repair. Also, the system is not easily incorporated into existing cars as it is located at the very rear of the vehicle and necessarily reduces the amount of available trunk space. Furthermore, a rear bumper and its associated structure, which are apparently not taken into consideration by Geropp, can significantly impair the amount of air drawn in through the openings and the ability of the system to reduce flow separation. Thus, while the Geropp system would be able to reduce flow separation, the system is apparently not optimally designed for existing automobiles.

The conventional systems designed to improve the aerodynamics of a vehicle have been primarily limited to reducing drag by reducing the amount of flow separation. Some of the other aerodynamic problems in a vehicle, such as yaw sensitivity, vortex formation, and ground effect, have been mainly ignored.

SUMMARY OF THE INVENTION

In accordance with the present invention, in a preferred embodiment thereof, a blowing system for a ground vehicle comprises a source of air under pressure and a valve for regulating the flow of the air. The regulated flow is received in a plenum where the air is discharged through an opening in an outer surface of the vehicle at or near the rear thereof. The system has a controller for adjusting the amount of flow through the valve and thus through the plenum. With the blowing system of the invention, air discharged from the plenum reduces flow separation at the rear portion of the vehicle.

The air may be blown through a slot formed in an upper rear portion of the vehicle and/or a lower rear portion of the vehicle and is blown tangentially along the outer surface thereof. Each upper or lower slot may be divided into two or more slots with the air through each slot being independently controlled by its respective valve. The slots further may extend across the rear portion of the vehicle and partially along the sides. Alternatively, the air may be discharged through a plurality of openings in the rear portion of the vehicle at a right angle to the outer surface thereof.

In addition to reducing flow separation, the blowing system of the invention can eliminate vortex roll-up and flow separation which occur when a relative wind strikes one side of the vehicle at an angle. Further, the blowing system can adjust the lift of the vehicle when operating in ground effect and generate a nose-down or nose-up pitch, depending on that required to trim the car. Using differential right/left side blowing systems, the blowing system is able to counteract lateral and directional instabilities, such as those experienced with side winds. Blowing the system on one side of the vehicle can produce restoring rolling and yawing moments and thus lateral/directional stability.

In another aspect, the invention relates to a method for adjusting aerodynamic forces acting on a ground vehicle. The method comprises the steps of routing compressed air from a source to a valve and adjusting a flow of the compressed air with the valve. The air is passed from the valve into a plenum and is then discharged from the plenum through an opening in an outer surface of the vehicle. The valve is controlled so as to adjust the flow of compressed air through the valve and thus through the plenum. A result of the method is that the flow of compressed air discharged through the opening reduces flow separation from a rear portion of the vehicle, or adjusts the available lift as well as pitching, rolling or yawing moments to control the vehicle. To accomplish all of these aerodynamic benefits, the system described employs no external moving parts, such as spoilers, air dams, external airfoils, "whale tails," wings, etc.

BRIEF DESCRIPTION OF THE DRAWINGS

The accompanying drawings, which are incorporated in, and form a part of, the specification, illustrate preferred embodiments of the present invention and, together with the description, serve to illustrate and explain the principles of the invention. The drawings are not necessarily to scale, emphasis instead being placed on clearly illustrating the principles of the invention. In the drawings.

DETAILED DESCRIPTION

Figure 1A:
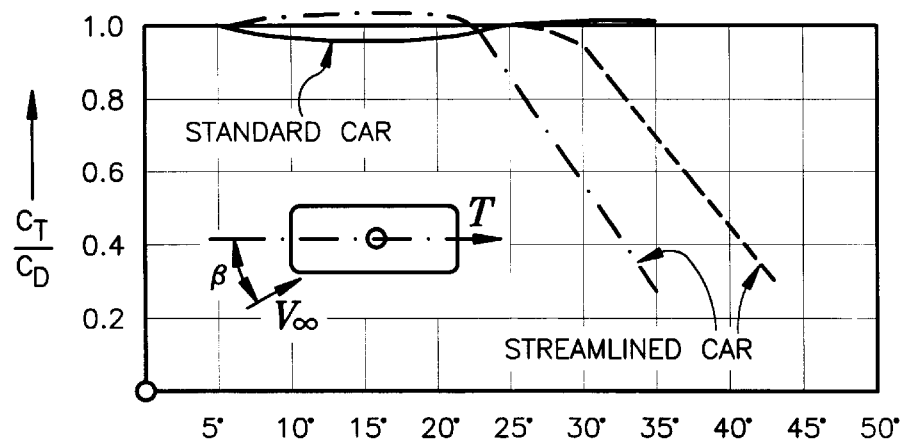
FIG. 1(A) is a graph of yaw sensitivity for a standard-type car and for a streamlined car.
Figure 1B:
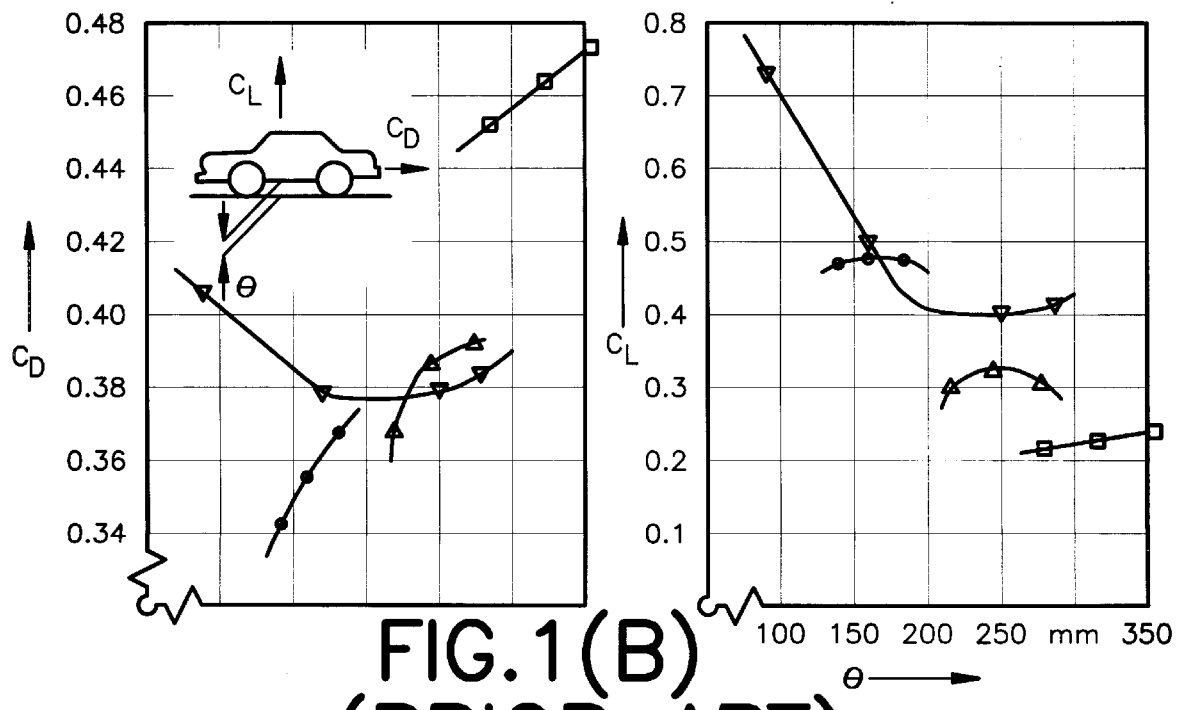
FIG. 1(B) is a graph of the ground effect for various vehicles at various heights above the ground.
Figure 2A:
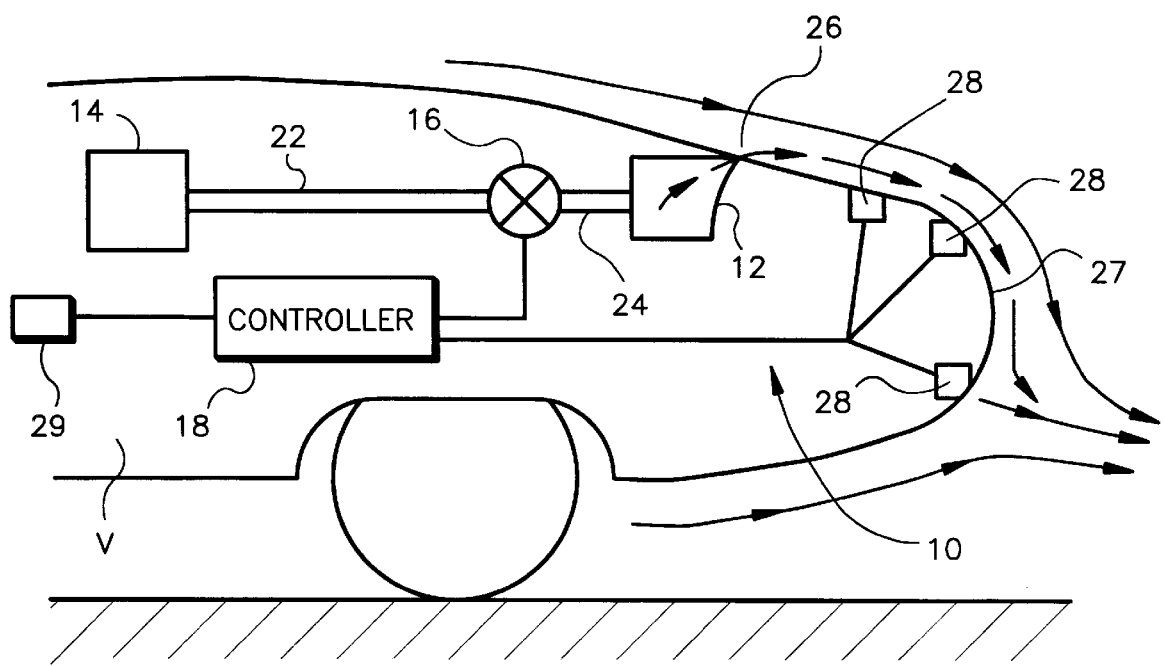
FIG. 2(A) is a diagram of a blowing system according to a first embodiment of the invention.

Reference will now be made in detail to the preferred embodiments of the invention, which are illustrated in the accompanying drawings. With reference to FIGS. 2(A) and (B), an air blowing system 10 according to a first embodiment of the invention is shown in a ground vehicle V. While the ground vehicle V is illustrated as an automobile, it should be understood that the invention is not limited to just automobiles but may be used with other types of ground vehicles, such as trucks, trains, trailers, and recreational vehicles. Further, the invention is not limited to a ground vehicle having the specific contours but may be incorporated into ground vehicles of various different shapes and sizes.

Figure 2B:
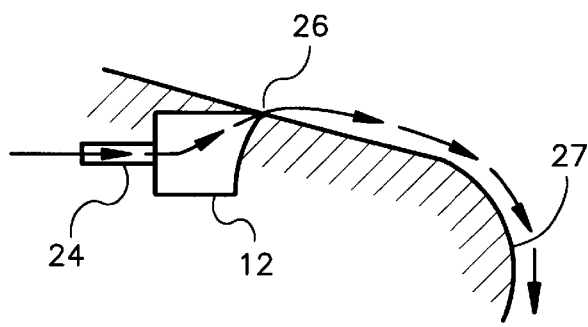
FIG. 2(B) is an enlarged partial sectional view of the blowing system of FIG. 2(A)

The blowing system 10 has a source of compressed air 14 for supplying compressed air through piping or ducts 22 to a flow valve 16. After passing through the flow valve 16, the air is routed through piping 24 into a plenum 12 and then out a tangential slot 26 formed in an outer surface of the vehicle V. The plenum 12 distributes the air so that the air is discharged through the tangential slot 26 along the entire length of the plenum 12 which extends transversely of the vehicle. The slot 26 preferably extends across the entire rear portion of the vehicle V and partially along the sides thereof. Downstream of the slot 26 is a curved surface 27 leading to the aft contour of the vehicle V. The flow of air through the valve 16 and hence into the plenum 12 is regulated by a controller 18. FIG. 2(B) shows an enlarged detail.

The air blown from the tangential slot 26 is preferably at a very low pressure and is discharged near the rear of the vehicle V over curved surface 27, although, as will be apparent hereinafter, the air flow velocity can for certain applications be quite high. As shown by the arrows representing the flow of air, the air remains attached to the rear rounded surfaces 27 of the vehicle, entrains the flow-field, and reduces, if not eliminates, flow separation. As a result, a clean, smooth, small wake is left behind the car, thereby greatly reducing the separation-induced drag. Because the drag is reduced, the cruise efficiency, fuel economy and performance can all be increased while the amount of interior noise can be decreased.

Due to the aerodynamic geometry of this aft surface 27 and slot 26, the source 14 of compressed air need only provide a minimal amount of compressed air in order to generate significant aerodynamic forces. Due to the small amounts of or small pressure requirements for the compressed air, the source 14 may comprise a component which already exists on the vehicle V and which requires no modifications or only slight modifications, such as an air conditioning compressor, a heater blower, a turbocharger, or a supercharger. On the other hand, the source 14 may be an entirely separate component which supplies compressed air only to the blowing system 10.

The blowing system 10 may be controlled in many different ways. For instance, the controller 18 may open the valve 16 only when the flow separation is detected by one or more turbulence sensors 28 located at the rear of the vehicle V. Thus, the controller 18 could adjust the flow of air through the valve 16 until a sufficient amount of air is discharged through the slot 26 to eliminate flow separation.

The controller 18 may also adjust the valve 16 based upon an external input from a sensor or group of sensors 29. For instance, the controller 18 may open the valve 16 when the vehicle V reaches a certain speed and/or when the vehicle is accelerating less than a certain threshold amount. With this control scheme, the sensors 29 may comprise an engine RPM detector and an accelerometer. This approach in controlling the flow of air is preferred when the source 14 comprises a supercharger or turbocharger since these components would have excess flow at non-accelerating highway speeds. This control scheme is also desirable since the blowing system 10 generates a positive lift on the vehicle. Thus, at cruising speeds, the blowing system 10 may be activated to reduce the amount of weight on the vehicle's tires thereby reducing the amount of ground or rolling friction and increasing the cruising efficiency.

As another example of a control scheme, the blowing system 10 may have a sensor 29 for sensing the application of brakes. The blowing system 10 would discontinue the blowing of air through the plenum 12 when the brakes are applied so as to increase the amount of weight on the vehicle's tires, thereby improving the braking ability of the vehicle V. Other ways in which the blowing system 10 may be controlled will readily be apparent to those skilled in the art and, accordingly, will not be described in any further detail.

In the preferred embodiment, the controller 18 is a computer, the valve 16 is a solenoid valve, and the piping 22 and 24 are light-weight flexible tubing. The computer forming the controller 18 may comprise a separate computer dedicated to the blowing system 10 or may comprise an existing on-board computer that performs other functions in the operations of the vehicle V. Depending upon the specific manner in which the blowing system 10 is controlled, however, the controller 18 may comprise a programmable logic array (PLA) or other types of logic circuitry. The plenum 12 is preferably positioned near the gap between the rear trunk and the surface of the vehicle V whereby the blowing system 10 may be easily incorporated therein.

Figure 3:
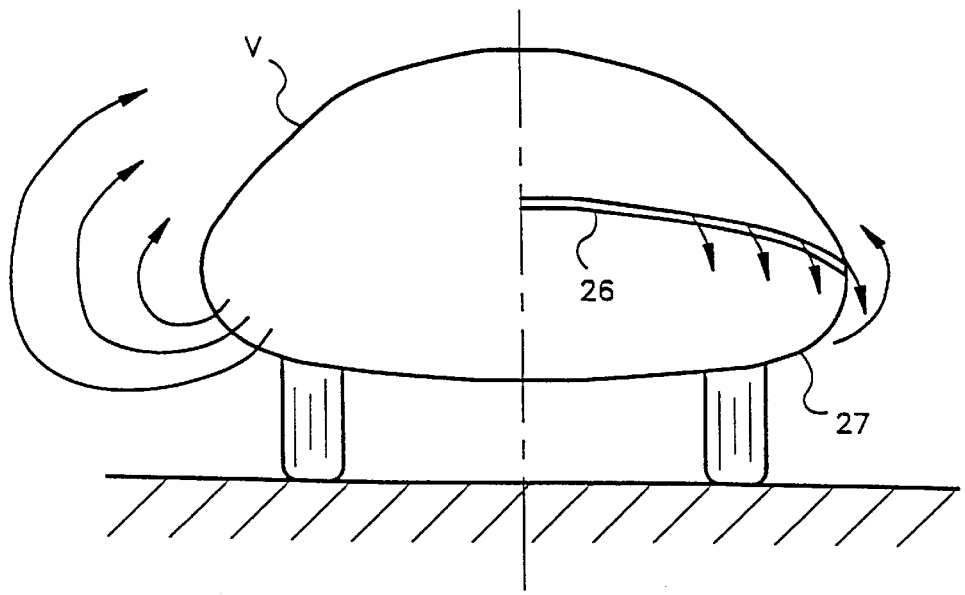
FIG. 3 is a rear diagram of a vehicle showing the effect of the blowing system of FIGS. 2(A) and (B) on vortex roll-up from the vehicles's aft corners.

The blowing system 10 may also be used to eliminate, or at least reduce, the vortex roll-up. With reference to FIG. 3, if the slot 26 curves with the rear contour of the vehicle V so that air is blown outward as well as downward, the discharged air offsets the vortex roll-up. This occurs because the jet exits tangentially to the surface 27 which is curved downstream of the slot 26. Aerodynamically, the jet remains attached to the surface because of the well known "Coanda effect." In FIG. 3, the left rear portion of the vehicle V is shown without the blowing system 10 and the effects thereof while the right rear portion of the vehicle V is shown with the blowing slot 26 of the invention. Since the induced drag on the vehicle V is a function of the vehicle lift coefficient squared, any reduction in vortex roll-up will significantly reduce the amount of induced drag on the vehicle V. An additional control feature here is that the blowing slot 26 may be tailored in height in the span-wise direction towards the curved side of the vehicle V, so that for the same pressure in plenum 12, varying slot mass flow rates are possible as needed to offset the vortex formation.

Figure 4:
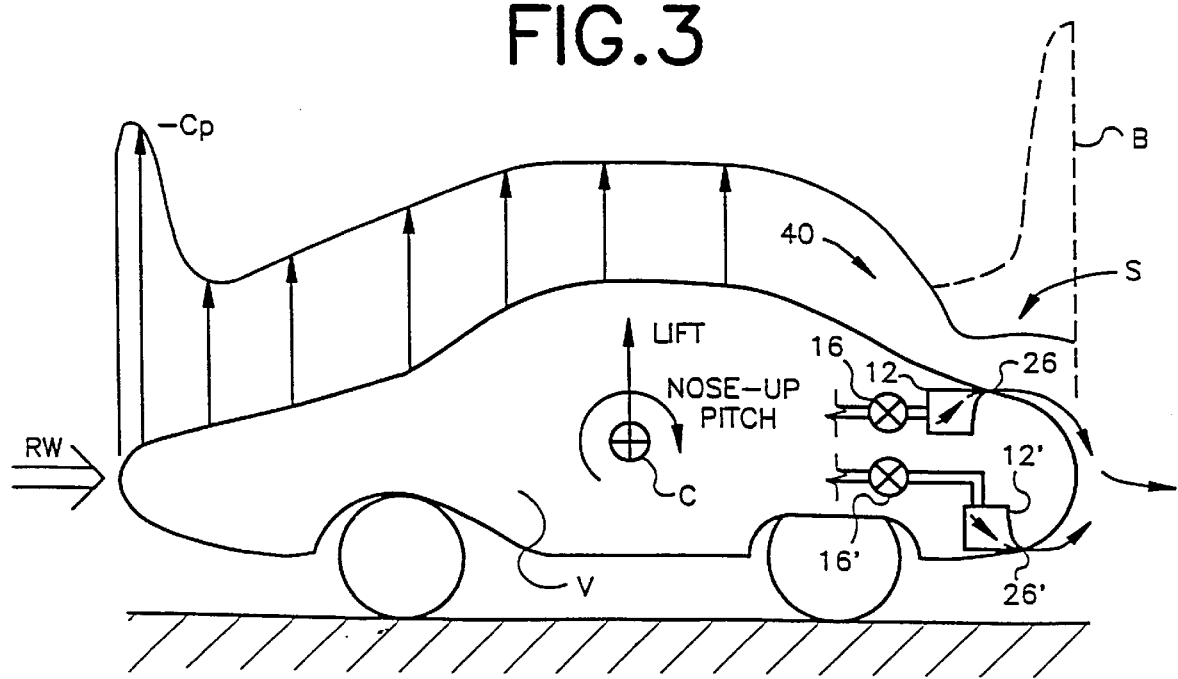
FIG. 4 is a side diagram of a vehicle showing the effects on the vehicle's pressure distribution of a blowing system according to a second embodiment of the invention.

As shown in FIG. 4, when the vehicle V experiences a relative wind RW, the air flow over the vehicle V becomes separated S at the rear portion of the vehicle V. Additionally, the vehicle V experiences nose-up pitch and lift as a result of a high velocity flow and negative pressures (−Cp) over the front upper surface of the vehicle V. Nose-up pitch relative to the vehicle's center of gravity C can unload the front steering wheels of the car, thereby reducing the amount of traction and the amount of steering control. If the vehicle V experiences too much lift, the vehicle V can lose traction in both the straight ahead and sideways directions.

A blowing system 40 according to a second embodiment of the invention can control the amount of lift and nose-up pitch as well as reduce the flow separation. With reference to FIG. 4, the blowing system 40 discharges air through the slot 26 formed at the rear portion of the vehicle V. In addition to eliminating the separated flow S, the air discharged through slot 26 generates a large negative pressure region B at the rear portion of the vehicle V. The negative pressure region B tends to produce a nose-down pitch in the vehicle V, thereby offsetting the nose-up pitch caused by the relative wind RW. The effect of this negative pressure region B is also to return traction and steering control to the vehicle V. This upper surface negative pressure also produces lift, which reduces weight on the rear wheels and thus reduces rolling friction.

The blowing system 40 also has a slot 26' located in a lower rear portion of the vehicle V. As with the slot 26, air blown out of the lower slot 26' can also reduce separated flow. The lower slot 26', however, can additionally generate a negative lift on the vehicle's undersurface, thus increasing the download on the wheels and increasing traction. Although the lower slot 26' and the slot 26 may be controlled jointly, the lower slot 26' preferably has a separate valve 16' for independently adjusting the amount of air blown through the slot 26'. While not shown, the valves 16 and 16' are both controlled by the controller 18 and both receive a supply of compressed air from the source 14. The controller 18 may selectively blow air out of the lower slot 26' during sharp cornering or in braking in order to increase traction. The sensor 29 could therefore sense the angle of steering and/or the application of the brakes. The amount of desired pitch and lift can be easily controlled by variation of the blowing rate.

In general, blowing-enhanced forces and moments usually vary linearly above a certain threshold with the blowing coefficient and can generate forces which occur virtually instantaneously. In fact, the air blown out of the slots 26 and 26' can be at a velocity equal to or even greater than the speed of sound. The blowing coefficient parameter $C_{\mu 2}$ can be determined according to the following equation:

$$C_\mu = \dot{m} V_j / (qS) \qquad \text{(EQ. 1)}$$

where $\dot{m}$ is the blowing mass flow, $V_j$ is the blowing jet velocity, q is the free-stream dynamic pressure, and S is the reference frontal area. As apparent from Equation 1, significant blowing forces and moments can be generated when the blowing jet velocity $V_j$ is near the speed of sound. This means that aerodynamic response to the blowing is practically instantaneous, yielding very high response rates when employed as a control system. The pressure of air from the source 14 or the dimensions of the slot 26 may be varied in order to adjust the value of the blowing coefficient parameter $C_\mu$.

Figure 5:
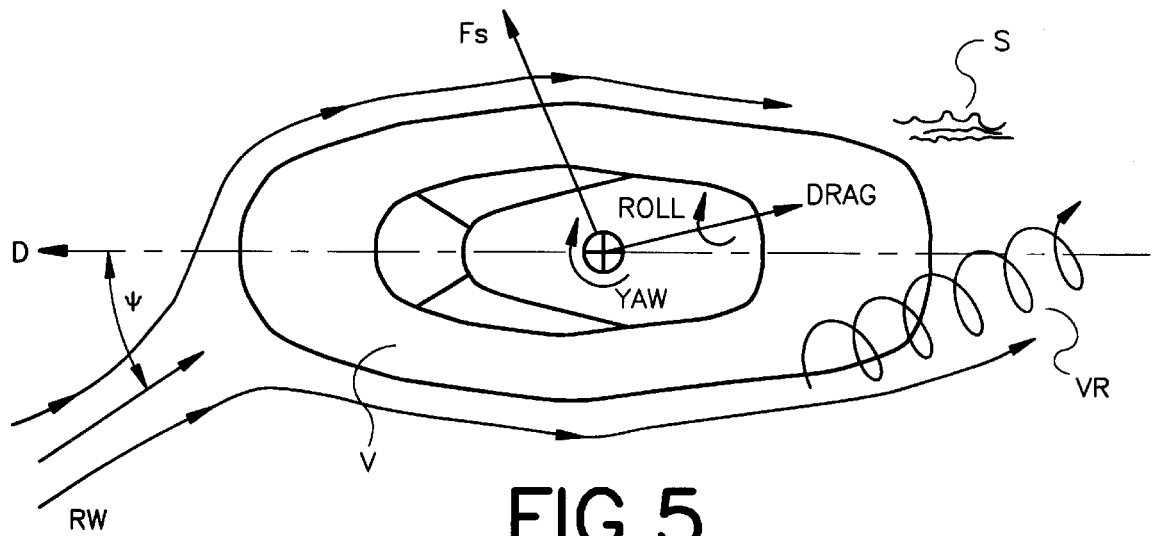
FIG. 5 is an air flow diagram illustrating directional and lateral Instabilities exhibited by a vehicle.

FIG. 5 depicts a number of aerodynamic forces and moments which are exerted on a vehicle V when the vehicle V travels in a direction D and is subjected to a relative wind RW at a yaw angle $\psi$. The relative wind RW at the yaw angle $\psi$ may be caused by side gusts of wind or may be caused by other ground vehicles passing the vehicle V in the same or opposite directions. This relative wind RW will cause the vehicle V to have vortex roll-up VR on the same side of the vehicle V as the wind RW and at the rear of the vehicle V. The vehicle will also have flow separation S at the rear of the vehicle V on the opposite side of the vehicle V to the wind RW.

Due to the relative wind RW, the vehicle V is subjected to a side force $F_S$ pushing the vehicle V at an angle relative to the direction D of travel. The vehicle V will have drag from the flow separation S and the vortex roll-up VR and will experience both roll and yaw moments in the directions shown. These moments can produce lateral and directional instabilities which can make driving the vehicle V extremely hazardous at higher speeds with side winds.

Figure 6:
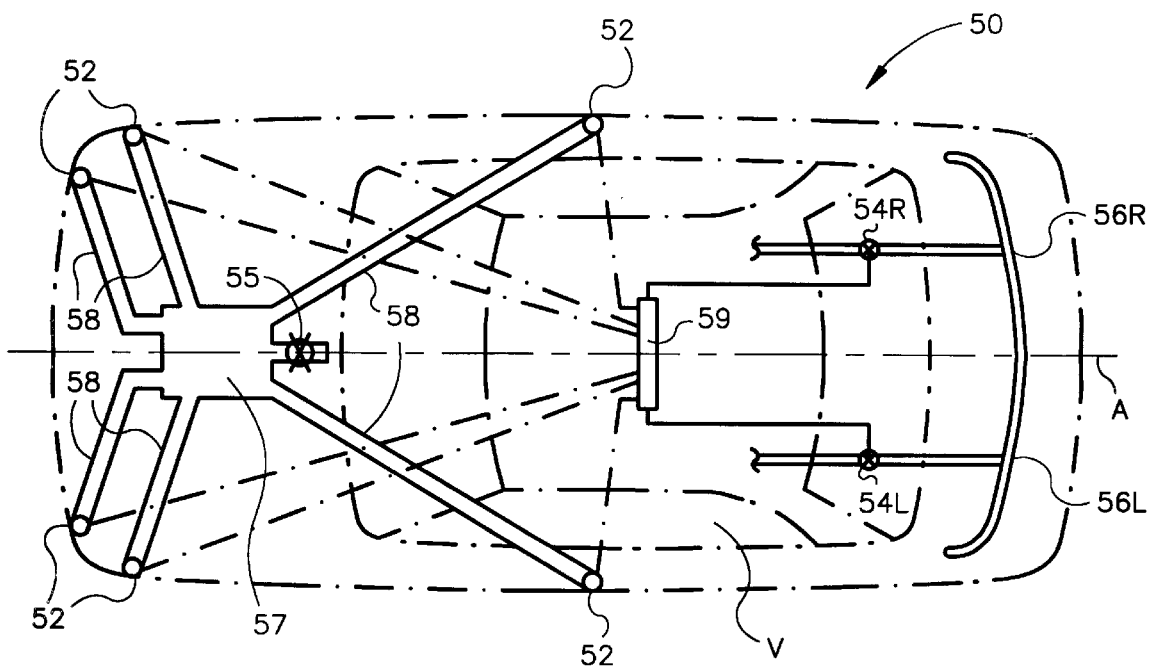
FIG. 6 is a top diagram of a vehicle with a third embodiment of a blowing system according to the invention.

With reference to FIG. 6, a blowing system 50 according to a third embodiment of the invention is able to counteract these moments and asymmetric forces. The blowing system 50 has a number of sensors 52 positioned about the surface of the vehicle V to detect the direction and pressure of the relative wind RW. The sensors 52 preferably comprise differential pressure probes which react to the difference in pressure between the pressure on the surface of the vehicle V and a reference space 57, which is connected to the atmosphere through a throttle path 55. Each sensor 52 is connected to the reference space 57 by a pipe or hose 58 and provides its electrical output to a controller 59. Based upon the outputs from the sensors 52, the controller 59 determines the direction and pressure of the relative wind RW. The preferred manner of determining the direction and pressure of the relative wind RW is disclosed in U.S. Pat. No. 4,987,542 to Tran, which is hereby incorporated by reference.

The blowing system 50 comprises a left plenum 56L and a right plenum 56R which respectively receive a supply of compressed air from valves 54L and 54R. While not shown, the valves 54L and 54R both receive compressed air from the same source, such as source 14, but are independently controlled by the controller 59. Thus, the valves 54L and 54R may be controlled so that air is blown out through neither of the plenums 56L or 56R, through only the left plenum 56L, through only the right plenum 56R, or through both plenums 56L and 56R at the same or unequal rates.

Figure 7:
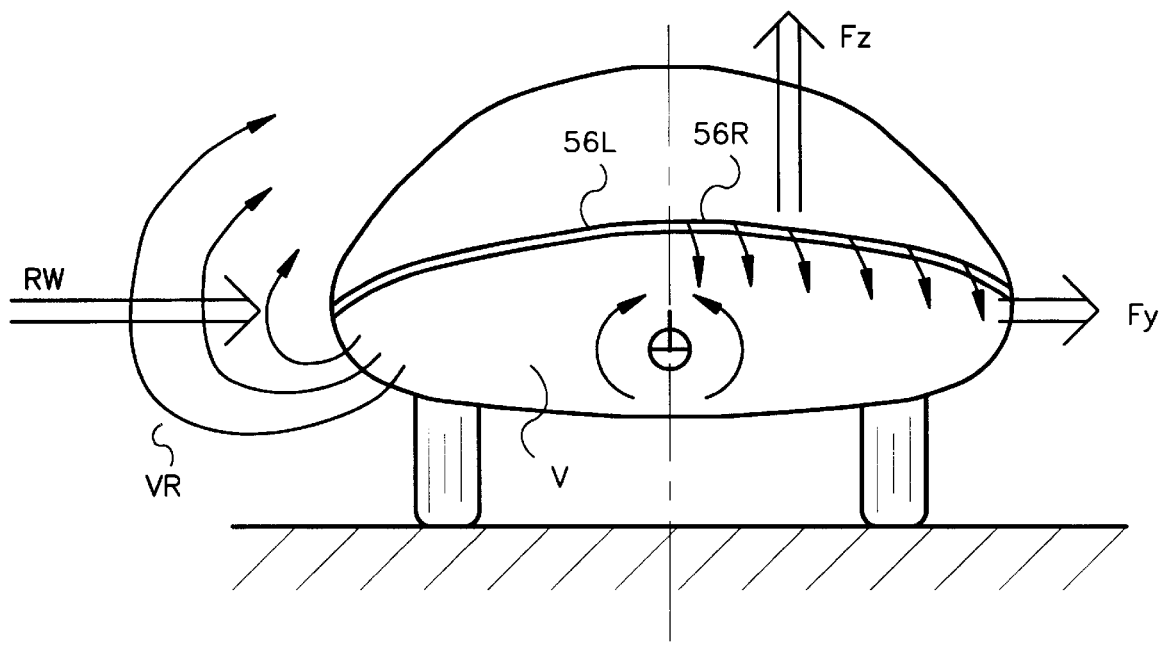
FIG. 7 is a rear diagram of a vehicle showing the effect of the asymmetric blowing system of FIG. 6 on vortex roll-up.

With reference to FIG. 7, when the vehicle V receives a relative wind at a yaw angle $\psi$ at the front left portion of the vehicle V as shown in FIG. 5, the vehicle V will have vortex roll-up on the left rear portion of the vehicle V. The blowing system 50 will detect the direction and pressure of the relative wind RW through the sensors 52 and controller 59. Based on this information, the controller 59 will cause air to be blown out of only the right slot 56R at a certain calculated rate. The air blown out of right slot 56R reattaches the flow and generates yawing and rolling moments due to asymmetric blowing and an aft side force $F_Y$ to the right and right lift force $F_Z$ which oppose the moments and force generated by the relative wind RW. Thus, by blowing air out of slot 56R, the vehicle V is returned to its desired straight-ahead motion and has its yaw and roll stability restored. The same results will occur by blowing the slot on the left side when the side wind is from the right side.

These counteracting forces and moments are produced by very low blowing rates. Based upon estimates from two-dimensional wind-tunnel tests by this inventor, the blowing system 50 can obtain aerodynamic force augmentation of up to 80 times the input blowing momentum.

Figure 8:
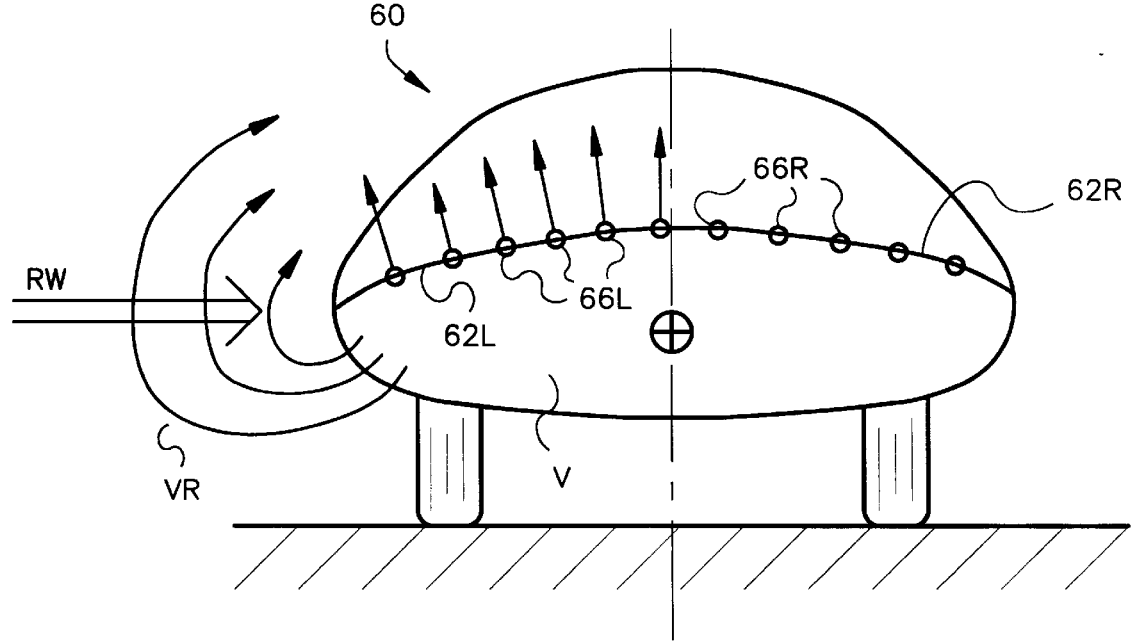
FIG. 8 as a rear diagram of a vehicle with a fourth embodiment of a blowing system according to the invention.

A blowing system 60 according to a fourth embodiment of the invention is shown in FIG. 8. The blowing system 60 comprises a plurality of apertures 66 for blowing jets of air perpendicular or nearly perpendicular to the vehicle's surface. The apertures 66 are divided into apertures 66L on the left side of the vehicle V which are controlled independently from apertures 66R on the right side of the vehicle V. After detecting the direction and pressure of the relative wind RW, the blowing system 60 can blow jets of air out of the apertures 66L near the vortex roll-up VR. These jets act as pneumatic spoilers. Thus, with this blowing system 60, the jets of air blown out of the apertures 66L counteract the vortex roll-up VR and prevent any unstable yaw or roll forces from occurring.

While not shown, the blowing system 60 may have a left plenum for supplying compressed air to the left set of apertures 66L and a right plenum for supplying compressed air to the right set of apertures 66R. By separately adjusting the flow of air into each plenum, the jets of air discharged by the left apertures 66L may be controlled independently from the jets of air discharged through the right apertures 66R. Alternatively, each aperture 66 in the outer surface of the vehicle V may be controlled independently.

Figure 9:
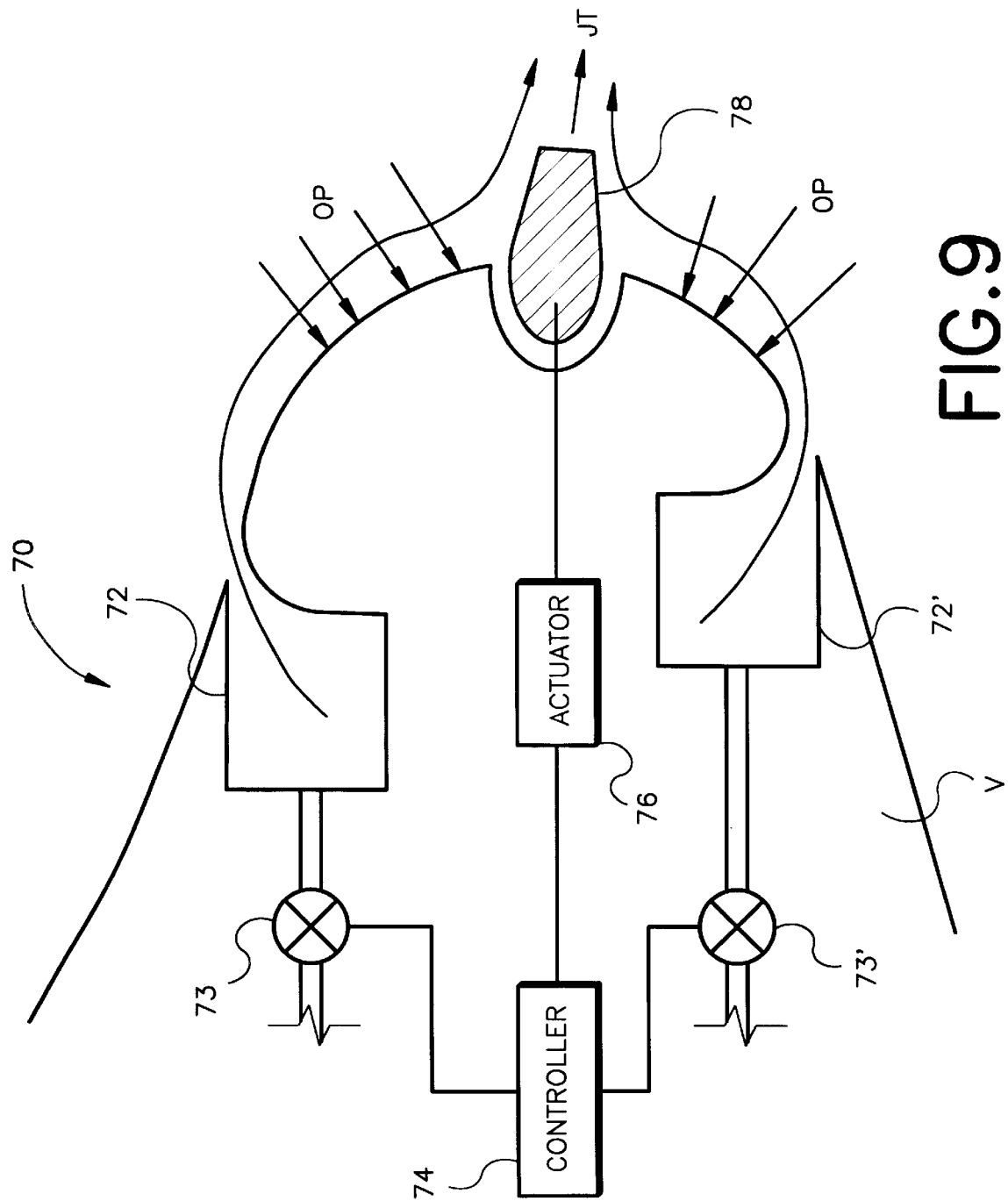
FIG. 9 is a side partial view of the aft portion of a vehicle with a fifth embodiment of a blowing system according to the invention.

A blowing system 70, according to a fifth embodiment of the invention shown in FIG. 9, comprises upper and lower plenums 72 and 72' with respective control valves 73 and 73'. The control valves 73 and 73' independently adjust the rates of air flowing through the plenums 72 and 72' based upon signals from a controller 74. In a manner similar to the embodiment of FIG. 4, the valves 73 and 73' may be controlled to reattach flow, reduce drag, generate a negative or positive lift, and generate nose-down pitch.

The blowing system 70 is shown on a vehicle V having a rear bumper 78. As shown by the arrows tangential to the surface of the vehicle V, the air does not become separated at the rear of the vehicle V but rather remains attached and generates a smooth wake. The air additionally produces over pressure regions OP on the rear surface of the vehicle V which produces a force in the direction of travel. Therefore, the effects of the rear bumper 78 may actually operate to reduce pressure drag on the vehicle V.

The blowing system may have an actuator 76 for controlling the positioning of a rear bumper 78. The air traveling along the rear surface of the vehicle V produces a jet thrust JT as it separates from the rear bumper 78. This jet thrust JT may be selectively directed to adjust the lift or the amount of nose-down pitch. For instance, the controller 74 may command the actuator 76 to pivot the rear bumper 78 to be at a downward angle when the vehicle V is cruising at non-accelerating highway speeds. The jet thrust JT leaving the rear bumper 78 would then produce a nose-down force and would generate lift at the rear of the vehicle V. The rear bumper 78 can therefore be used as an additional tool in controlling the aerodynamic forces on the vehicle V.

The actuator 76 may comprise any suitable device for altering the position of the rear bumper 78. As an example, the actuator 76 may comprise a motor and gearing for angling the bumper 78. The actuator 76 could alternatively be comprised of one or more pistons which are extended or retracted to position the bumper 78. Other variations will be apparent to those skilled in the art upon reading this description. In simplest form, the bumper could be fixed at a predetermined angle and require no actuator or adjustment.

The foregoing description of the preferred embodiments of the invention has been presented for purposes of illustrating the features and principles thereof. It is not intended to be exhaustive or to limit the invention to the precise forms disclosed. Many modifications and variations are possible in light of the above teachings.

For example, the invention may have a greater or lesser number of plenums than that described. Thus, in addition to having left and right plenums for either the upper or lower portions of the vehicle, each left or right plenum may be further divided into a number of regions. In this manner, the aerodynamic forces generated by the blowing system of the invention can be even more accurately controlled and directed. Also, as will be apparent to those skilled in the art, the blowing slot heights may vary along the span to produce varying distributions of lift, drag, and moments.

Also, it should be understood that a single embodiment may incorporate features of the other embodiments. For instance, while not illustrated, the embodiments of FIGS. 4 and 6 to 9 may comprise the turbulence sensors 28 and the sensor or sensors 29 depicted in FIG. 2(A). As another example, all of the embodiments may have the sensors 52 and other components for detecting the direction and pressure of the relative wind. The invention, however, is not limited to the number or type of sensors 52 shown in FIG. 6 but may detect the direction and pressure in other ways.

A blowing system according to the invention may additionally comprise various types of safety features. For instance, a blowing system may have another valve or another device to ensure that the plenum is completely disconnected from the source of compressed air.

The embodiments were chosen and described in order to explain the principles of the invention and their practical application; various other possible embodiments with various modifications as are suited to the particular use are also contemplated and fall within the scope of the present invention.

I claim:

1. An airflow control system for use with a ground vehicle for adjusting aerodynamic forces acting on said vehicle, said system comprising:

a around vehicle having a body said vehicle body having an outer surface comprising an upper outer surface and a lower outer surface;

a source of air under pressure said source of air internal to the body of said ground vehicle;

a first valve for receiving said air from said source and for regulating a first flow of said air;

means for receiving said first flow of air from said first valve and for discharging said air through a first opening in the upper outer surface of said ground vehicle, said air being discharged tangentially to the upper outer surface;

a second valve for receiving said air from said source and for regulating a second flow of said air;

a second means for receiving said second flow of air from said second valve and for discharging said air through a second opening in the lower outer surface of said ground vehicle, said air being discharged tangentially to the lower outer surface; and means for controlling said first valve and said second valve, said controlling means independently adjusting said flow of air through each valve;

wherein said air discharged through said first opening and said second opening augments aerodynamic forces acting on said ground vehicle and reduces flow separation downstream of said openings.

2. The airflow control system of claim 1, wherein said controlling means adjusts said air flowing through said first and second valves so that said air discharged through said openings generates a positive lift on said ground vehicle for reducing tire rolling friction.

3. The airflow control system of claim 1, wherein said controlling means adjusts said air flowing through said first and second valves so that said air discharged through said openings generates a negative lift force on said ground vehicle for increasing a download on said ground vehicle for augmenting braking and handling characteristics of said ground vehicle.

4. The airflow control system of claim 1, wherein said controlling means adjusts said air flows through said valves so that said air discharged through said openings generates a nose-down pitch on said ground vehicle.

5. The airflow control system of claim 1, wherein said controlling means adjusts said air flows through said valves so that said air discharged through said openings generates a nose-up pitch on said ground vehicle.

6. The airflow control system of claim 1, wherein said controlling means adjusts said air flowing through said valves so that said air discharged through said openings counteracts vortex roll-up on said ground vehicle.

7. The airflow control system of claim 1, further comprising at least one sensor for detecting turbulence and wherein said controlling means adjusts said flow through said first and second valves based on an output from said sensor.

8. The airflow control system of claim 1, further comprising means for detecting a direction and pressure of a relative wind and wherein said controlling means adjusts said flow through said first and second valves based upon said direction and pressure.

9. The airflow control system of claim 8, wherein said detecting means comprises a plurality of sensors located about said ground vehicle for detecting a differential amount of pressure between a pressure on said surface of said ground vehicle and a reference pressure.

10. A method for controlling aerodynamic forces acting on a ground vehicle by blowing air, said method comprising the steps of:
routing compressed air from a source to a first valve and a second valve;
adjusting a flow of said compressed air with said valves;
receiving said flow of compressed air from said first valve in a first plenum, and receiving said flow of compressed air from said second valve in a second plenum;
discharging said flow of compressed air out of said first plenum through a first opening in an upper surface of said ground vehicle and discharging said flow of compressed air out of said second plenum through a second opening in a lower surface of said ground vehicle, wherein said flow of compressed air is discharged tangential to said outer surface of said ground vehicle;
controlling said first valve and said second valve independently to adjust the air flow out of said first opening and said second opening; and
generating a negative lift force on said ground vehicle.

11. The method of claim 10, wherein said step of controlling comprises the steps of:
detecting a change in aerodynamic forces acting on said ground vehicle; and
controlling said air flow out of said first and second openings to compensate for said change in aerodynamic forces acting on said ground vehicle.

12. The method of claim 11, wherein said step of detecting a change in aerodynamic forces acting on said ground vehicle comprises detecting a direction and a pressure of a relative wind.

13. The method of claim 11, wherein said step of detecting a change in aerodynamic forces acting on said ground vehicle comprises detecting turbulence at a rear portion of said ground vehicle.

14. The method of claim 10, wherein said step of controlling comprises the steps of:
detecting a change in acceleration of said ground vehicle; and
controlling said air flow out of said first and second openings to adjust a lift force and a downforce acting on said ground vehicle.

15. The method of claim 10, wherein said step of generating a negative lift force comprises discharging a greater mass of compressed air out of said second opening than out of said first opening.

16. An airflow control system for use with a ground vehicle for adjusting aerodynamic forces acting on said ground vehicle, said system comprising:
a ground vehicle having a body, said vehicle body having an outer surface comprising an upper outer surface and a lower outer surface, said ground vehicle having a left side and a right side;
a source of air under pressure, said source of air internal to the body of said ground vehicle;
a left valve for receiving and regulating a first flow of air from said source of air under pressure;
a first means for receiving said first flow of air from said left valve and for discharging said air through a first opening in the outer surface of said ground vehicle, said first opening on the left side of said ground vehicle, said air being discharged tangentially to the ground vehicle outer surface;
a right valve for receiving and regulating a second flow of air from said source of air under pressure;
a second means for receiving said second flow of air from said right valve and for discharging said air through a second opening in the outer surface of said ground vehicle, said second opening on the right side of said ground vehicle, said air being discharged tangentially to the ground vehicle outer surface; and
means for independently controlling said left valve and said right valve, said controlling means independently adjusting said flow of air through each valve such that the flow of air out of said first and second openings are modified independently;
wherein said air discharged through said first opening and said second opening augments aerodynamic forces acting on said vehicle and reduces flow separation downstream of said openings.

17. The airflow control system of claim 16, wherein said controlling means adjusts said air flows through said first and second valves so that said air discharged through said openings generates a positive lift on said vehicle for reducing tire rolling friction on a ground based vehicle.

18. The airflow control system of claim 16, wherein said controlling means adjusts said air flows through said first and second valves so that said air discharged through said openings generates a negative lift force on said vehicle for increasing a download on said vehicle for augmenting braking and handling characteristics of said vehicle.

19. The airflow control system of claim 16, wherein said controlling means adjusts said air flows through said valves so that said air discharged through said openings generates a nose-down pitch.

20. The airflow control system of claim 16, wherein said controlling means adjusts said air flows through said valves so that said air discharged through said openings generates a nose-up pitch.

21. The airflow control system of claim 16, wherein said controlling means adjusts said air flows through said valves so that said air discharged through said openings counteracts vortex roll-up.

22. The airflow control system of claim 16, further comprising at least one sensor for detecting turbulence and wherein said controlling means adjusts said flow through said left and right valves based on an output from said sensor.

23. The airflow control system of claim 16, further comprising means for detecting a direction and pressure of a relative wind and wherein said controlling means adjusts said flow through said left and right valves independently based upon said direction and pressure.

24. The airflow control system of claim 23, wherein said detecting means comprises a plurality of sensors located about said vehicle for detecting a differential amount of pressure between a pressure on said surface of said vehicle and a reference pressure.

25. A method for adjusting aerodynamic forces acting on a ground vehicle by blowing air, said method comprising the steps of:
providing a ground vehicle having a body with an outer surface;
routing compressed air from a source of air under pressure to a valve, said source of air under pressure internal to said ground vehicle;

adjusting a flow of said compressed air with said valve;

receiving a first flow of compressed air from said valve in a left plenum positioned on a left side of said ground vehicle, and receiving a second flow of compressed air from said valve in a right plenum on a right side of said ground vehicle;

discharging said first flow of compressed air from said left plenum and through a first opening in a left side of said outer surface of said ground vehicle;

discharging said second flow of compressed air from said right plenum and through a second opening in a right side of said outer surface of said ground vehicle;

directing said first and second flows of compressed air out of said first and second openings to discharge tangential to said outer surface of said ground vehicle;

generating a region of increased negative pressure along the outer surface of the ground vehicle downstream of said first and second openings, said negative pressure region altering the aerodynamic forces acting on said ground vehicle and creating rolling and yawing moments on said ground vehicle;

detecting a relative wind acting on said ground vehicle; and controlling said valve to adjust said first and second flows of compressed air out of said first and second openings to compensate for said relative wind.

26. The method of claim 25, wherein said detecting step comprises detecting a direction and pressure of a relative wind with pressure probes on said outer surface of said ground vehicle.

27. A method for controlling aerodynamic forces acting on a ground vehicle by blowing air, said method comprising the steps of:

routing compressed air from a source of pressurized air through a first control valve and a second control valve;

receiving a first flow of compressed air from said first control valve in a first plenum, and receiving a second flow of compressed air from said second control valve in a second plenum;

discharging said first flow of compressed air out of said first plenum through a first opening in a left side of an outer surface of said ground vehicle, said first flow discharging tangential to said outer surface;

discharging said second flow of compressed air out of said second plenum through a second opening in a right side of an outer surface of said ground vehicle, said second flow discharging tangential to said outer surface; and reducing vortex roll up on said ground vehicle.

28. The method of claim 27, wherein said step of reducing vortex roll up comprises:

detecting a relative wind acting on said vehicle;

adjusting said first and second control valves in response to said relative wind; and creating differential flow rates of air out of said first and second openings in order to compensate for said relative wind.

* * * * *